United States Patent
Ben-Shahar et al.

(10) Patent No.: US 9,307,302 B2
(45) Date of Patent: Apr. 5, 2016

(54) PASSIVE OPTICAL NETWORK SWITCH

(71) Applicant: Marvell World Trade Ltd., St. Michael (BB)

(72) Inventors: Israel Ben-Shahar, Mevaseret Zion (IL); Dimitry Melts, Cupertino, CA (US); Roman Kleinerman, Netaim (IL)

(73) Assignee: Marvell World Trade Ltd., St. Michael (BB)

( * ) Notice: Subject to any disclaimer, the term of this patent is extended or adjusted under 35 U.S.C. 154(b) by 47 days.

(21) Appl. No.: 14/076,694

(22) Filed: Nov. 11, 2013

(65) Prior Publication Data

US 2014/0133853 A1    May 15, 2014

Related U.S. Application Data

(60) Provisional application No. 61/725,169, filed on Nov. 12, 2012.

(51) Int. Cl.
*H04J 14/00* (2006.01)
*H04Q 11/00* (2006.01)
*H04L 12/931* (2013.01)

(52) U.S. Cl.
CPC .......... *H04Q 11/0005* (2013.01); *H04L 49/351* (2013.01); *H04Q 11/0067* (2013.01)

(58) Field of Classification Search
CPC .......... H04Q 11/0005; H04Q 11/0067; H04L 49/351
USPC ............... 398/45–57, 58, 66, 70, 71
See application file for complete search history.

(56) References Cited

U.S. PATENT DOCUMENTS

| | | | |
|---|---|---|---|
| 2003/0048506 A1* | 3/2003 | Handelman | 359/128 |
| 2004/0052527 A1* | 3/2004 | Kirby | 398/57 |
| 2009/0208210 A1* | 8/2009 | Trojer et al. | 398/58 |
| 2009/0219818 A1* | 9/2009 | Tsuchiya | 370/236 |
| 2010/0232794 A1* | 9/2010 | Zheng | 398/68 |
| 2011/0229131 A1* | 9/2011 | Izenberg et al. | 398/45 |
| 2011/0249972 A1* | 10/2011 | Nemoto et al. | 398/66 |
| 2013/0028072 A1* | 1/2013 | Addanki | 370/218 |
| 2013/0286845 A1* | 10/2013 | Smith et al. | 370/235.1 |
| 2013/0308658 A1* | 11/2013 | Le Pallec et al. | 370/503 |

* cited by examiner

*Primary Examiner* — M. R. Sedighian

(57) ABSTRACT

A Passive Optical Network (PON) Switch which breaks down and regenerates a point to multipoint optical communication signals that are compliant with a PON protocol between an Optical Line Terminal (OLT) and an Optical Network Unit (ONU) by performing a conversion between optical communication signals compliant with PON protocol and data units compliant with Ethernet protocol.

13 Claims, 5 Drawing Sheets

PASSIVE OPTICAL NETWORK SWITCH

CROSS-REFERENCE TO RELATED APPLICATION

This application claims priority from U.S. Provisional Patent Application No. 61/725,169 filed on Nov. 12, 2012, the contents of which are incorporated by reference in their entirety.

BACKGROUND

1. Field

The current disclosure relates to Passive Optical Network (PON) network equipment, and more specifically to PON network equipment configured to perform a switching operation on optical communication signals compliant with a PON protocol.

2. Description of Related Art

The background information provided herein is for the purpose of generally presenting the context of the disclosure. Work of the presently named inventor, to the extent it is described in this background section, as well as aspects of the description that may not otherwise qualify as prior art at the time of filing, are neither expressly nor impliedly admitted as prior art against the present disclosure.

Two approaches for PON deployment include Fiber To The Home (FTTH) and Fiber To The Building (FTTB). In FTTH, optical fiber is laid out all the way to the home. The devices located in the home are PON Optical Network Units (ONU) (e.g. Single Family Unit (SFU) or Home Gateway Unit (HGU)). In FTTB, optical fiber is laid out to the basement of the building and copper wiring is used from the basement to the individual homes in the building. In this approach, the fiber is terminated in the basement of the building with a Multi Dwelling Unit (MDU) ONU or a Multi-Tenant Unit (MTU) ONU.

SUMMARY

According to an example embodiment, a network switching apparatus includes optical ports configured to communicate optical communication signals according to a Passive Optical Network (PON) protocol, including a first optical port and a second optical port; the first optical port configured to communicate as an optical line terminal (OLT) end-point using a point-to-multipoint optical communication signal according to a PON protocol; and the second optical port configured to communicate as an optical network unit (ONU) end-point using the point-to-multipoint optical communication signal according to a PON protocol; each of the optical ports further comprising a converter configured to carry out a conversion between point-to-multipoint optical communication signals compliant with a PON protocol and data units that are compliant with an Ethernet protocol; and a packet switch coupled to the optical ports, the packet switch including a switching circuit configured to forward the data units between the first optical port and the second optical port according to the Ethernet protocol based on header information of the respective data units.

According to another example embodiment, the packet switch further includes electrical switch ports configured to forward data units compliant with an Ethernet protocol. The electrical switch ports includes a first electrical switch port configured to communicate the data units with the first optical port, and a second electrical switch port configured to communicate the data units with the second optical port.

According to another example embodiment, the optical ports each further include a point-to-multipoint optical communication signal receiver/transmitter; and an Ethernet compliant electrical signal receiver/transmitter. The converter is connected to the point-to-multipoint optical communication signal receiver/transmitter and the Ethernet compliant electrical signal receiver/transmitter, and is configured to carry out a conversion between point-to-multipoint optical communication signal compliant with a PON protocol and data units that are compliant with an Ethernet protocol.

According to another example embodiment, the first optical port is configured to communicate the first point-to-multipoint optical communication signal with one of an OLT and an ONU according to one of an Ethernet PON (EPON) point-to-multipoint protocol and a Gigabit PON (GPON) point-to-multipoint protocol, and the second optical port is configured to communicate the second point-to-multipoint optical communication signal with one of an OLT and an ONU according to one of the EPON point-to-multipoint protocol and the GPON point-to-multipoint protocol.

According to another example embodiment, the first optical port is configured to communicate the first point-to-multipoint optical communication signal at a first rate comprising one of a 1 Gigabit/Sec (Gb/s) data rate and a 10 Gb/s data rate; and the second optical port is configured to communicate the second point-to-multipoint optical communication signal at a second rate comprising one of the 1 Gb/s data rate and the 10 Gb/s data rate.

According to another example embodiment, the first rate is different from the second rate.

According to another example embodiment, one or more of the optical ports each further include a control unit responsive to a selection signal to set the converter to perform the conversion using one of the EPON point-to-multipoint protocol and the GPON point-to-multipoint protocol and the Ethernet point-to-point protocol.

According to another example embodiment, the packet switch is further configured to forward data units that are compliant with an Ethernet protocol, corresponding to the point-to-multipoint optical communication signal compliant with a PON protocol, from the first electrical switch port to the second electrical switch port using one of layer 2 and layer 3 forwarding mechanisms.

According to another example embodiment, a method for conveying signals in a PON network includes receiving a first optical communication signal according to a Passive Optical Network (PON) protocol, carrying out a first conversion, from the first optical communication signal to data units compliant with an electrical Ethernet protocol, using an Ethernet compliant switching circuit to forward the converted data units, based on respective header information, carrying out a second conversion, from the converted data units to a second optical communication signal, and transmitting the second optical communication signal according to the PON protocol.

According to another example embodiment, communicating one of the first and the second optical communication signals according to the PON protocol includes communicating point-to-multipoint optical communication signals with one of an Optical Line Terminal (OLT) and an Optical Network Unit (ONU) according to one of an Ethernet PON (EPON) point-to-multipoint protocol and a Gigabit PON (GPON) point-to-multipoint protocol.

According to another example embodiment, the communicating point-to-multipoint optical communication signals further includes communicating the first point-to-multipoint optical communication signal at one of a 1 Gigabit/Sec (Gb/s) data rate and a 10 Gb/s data rate.

According to another example embodiment, the carrying out at least one of the first conversion and the second conversion includes carrying out the conversion using one of the EPON point-to-multipoint protocol and the GPON point-to-multipoint protocol, in accordance with a selection signal.

According to another example embodiment, the using an Ethernet compliant switching circuit to forward the converted data units includes forwarding the converted data units using one of a layer 2 and a layer 3 forwarding mechanism.

DETAILED DESCRIPTION

Embodiments will be described below in more detail with reference to the accompanying drawings. The following detailed descriptions are provided to assist the reader in gaining a comprehensive understanding of the methods, apparatuses, and/or systems described herein and equivalent modifications thereof. Accordingly, various changes, modifications, and equivalents of the methods, apparatuses, and/or systems described herein will be apparent to those of ordinary skill in the art. Moreover, descriptions of well-known functions and constructions may be omitted for increased clarity and conciseness.

The terms used in the description are intended to describe embodiments only, and shall by no means be restrictive. Unless clearly used otherwise, expressions in a singular from include a meaning of a plural form. In the present description, an expression such as "comprising" or "including" is intended to designate a characteristic, a number, a step, an operation, an element, a part or combinations thereof, and shall not be construed to preclude any presence or possibility of one or more other characteristics, numbers, steps, operations, elements, parts or combinations thereof.

Figure 1:
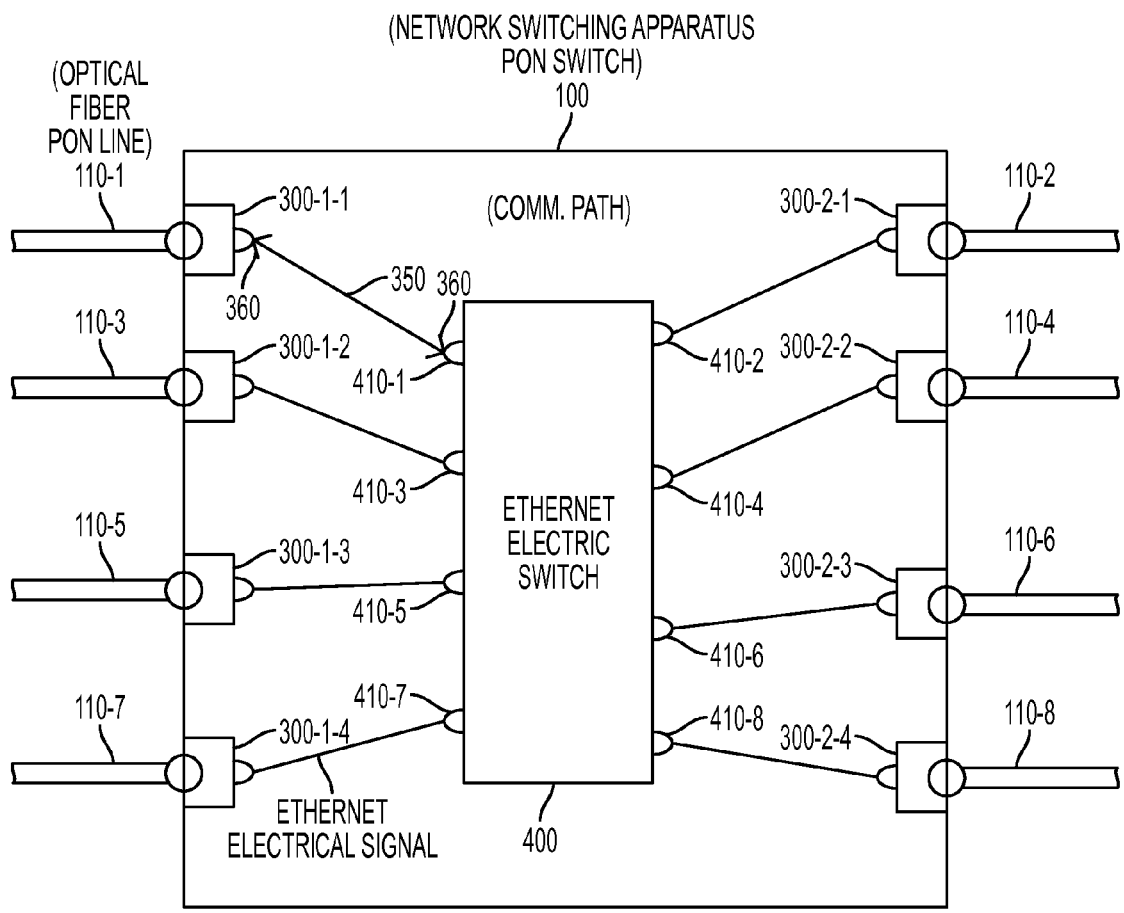
FIG. 1 illustrates an overview of a PON Switch according to an example embodiment.

FIG. 1 illustrates an overview of a PON Switch having a plurality of ports, an Ethernet electrical switch, and communication paths between the ports and the Ethernet electrical switch, according to an example embodiment.

As illustrated in the FIG. 1 example, the PON Switch 100 includes Optical Fiber PON Lines (110-1 to 110-8), Ports (300-1-1 to 300-1-4 and 300-2-1 to 300-2-4) and an Ethernet Electric Switch 400 according to an example embodiment. Although 8 ports are seen in the FIG. 1 example, the actual number of ports in the PON Switch 100 varies, according to another example embodiment, for example as a function of network topology, network size, location of the PON switch in an optical network and the like.

Figure 2:
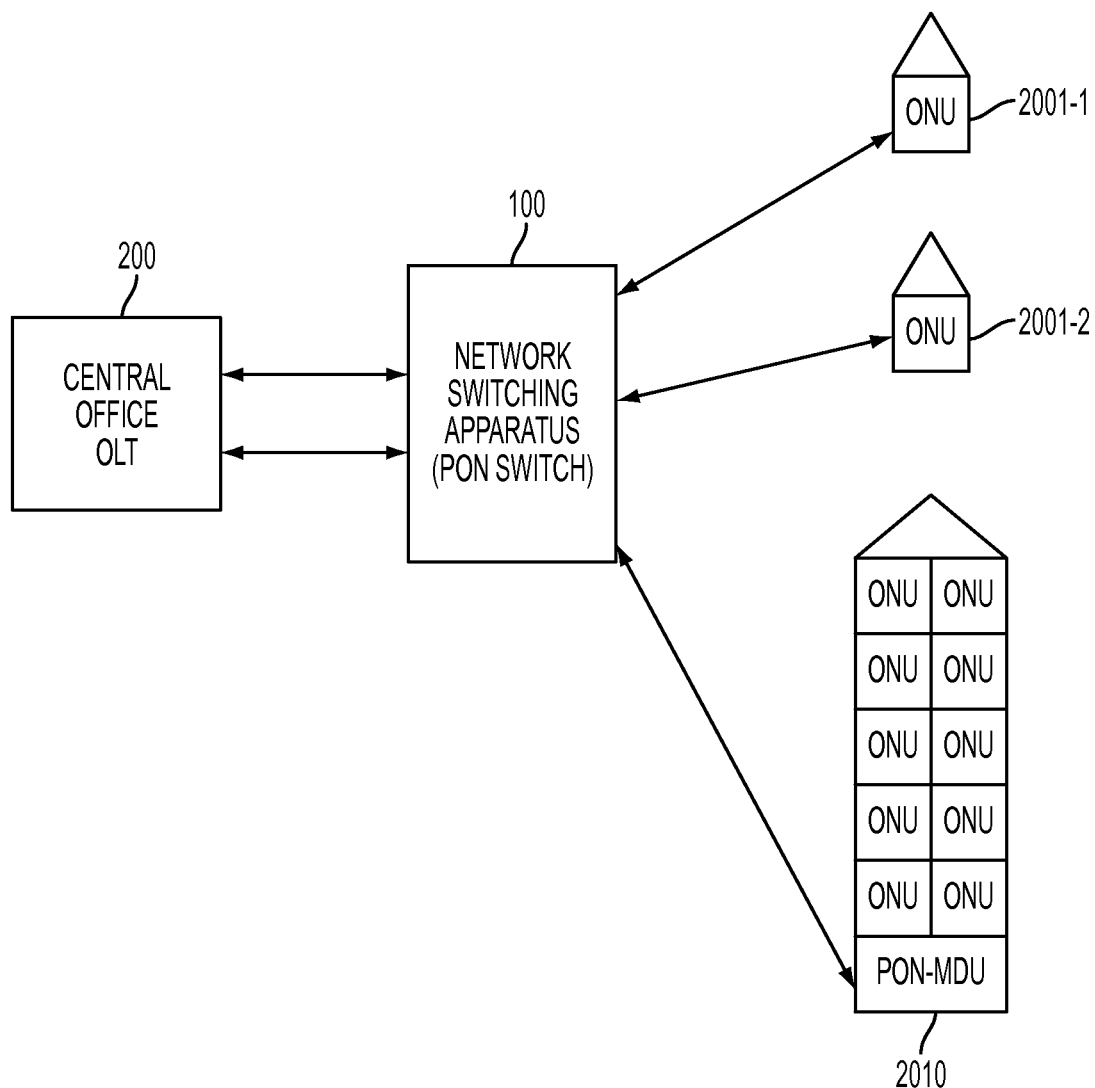
FIG. 2 illustrates an overview of a system depicting communication between a central office OLT, PON Switch and a PON MDU (FTTB)/ONU(FTTH).

The Ports (300-1-1 to 300-1-4) are configured as two-way ports enabled to send and/or receive point to multipoint optical communication signals, that are compliant with a PON protocol, to/from an OLT such as OLT 200 shown in FIG. 2, according to an example embodiment. The number of ports on the PON Switch 100 configured to receive point to multipoint optical communication signals that are compliant with a PON protocol vary, according to another example embodiment. Under PON, two standards are the EPON protocol and the Gigabit PON (GPON) protocol. EPON operates at 1 Gbit/s (1G-EPON) or 10 Gbit/s (10G-EPON). GPON operates at 2.5 Gbit/s downstream/1 Gbit/s upstream (2.5G-GPON) or 10 Gbit/s downstream 2.5 Gbit/s upstream (10G-GPON). The Ports (300-1-1 to 300-1-4) are configured to operate according to one or all of the above standards while receiving and/or transmitting point to multipoint optical communication signals that are compliant with a PON protocol from the OLT, according to an example embodiment.

The OLT point to multipoint optical communication signals that are compliant with a PON protocol are generally supplied, in a concrete example, to line cards of the PON switch 100. Once the signal reaches the Ports (300-1-1 to 300-1-4) through the Optical Fiber PON Lines from the OLT (110-1, 110-3, 110-5, 110-7), the point to multipoint optical communication signals that are compliant with a PON protocol are converted to data units that are compliant with an Ethernet protocol. This conversion process is described in more detail below with reference to FIG. 3. As shown in FIG. 4 and discussed in more detail below, each of the Ports (300-1-1 to 300-1-4 and 300-2-1 to 300-2-4) is connected via communication path 350 to a Sub-Port (410-1 to 410-8 in FIG. 4) of the Ethernet Electric Switch 400, according to an example embodiment.

The Sub-Ports (410-1 to 410-8 in FIG. 4) belonging to the Ethernet Electrical Switch 400 are configured to communicate data units in an Ethernet compliant electrical form between different Ports (300-1-1 to 300-1-4 and 300-2-1 to 300-2-4) belonging to the PON Switch 100 based on header information of the respective data units, according to an example embodiment. This too is further explained below with reference to FIG. 4. After the data units in an Ethernet compliant electrical form have been communicated from the Sub-Ports (410-1 to 410-8 FIG. 4) of the Ethernet Electric Switch 400 to the Ports (300-2-1 to 300-2-4), the data units that are compliant with an Ethernet protocol are converted back to point to multipoint optical communication signals that are compliant with a PON protocol at the Ports (300-2-1 to 300-2-4), according to an example embodiment.

Although FIG. 1 shows that the conversion between point to multipoint optical communication signals that are compliant with a PON protocol and data units that are compliant with an Ethernet protocol takes place at the Ports (300-1-1 to 300-1-4 and 300-2-1 to 300-2-4), the PON Switch 100 includes a separate conversion module to perform the conversion between point to multipoint optical communication signals that are compliant with a PON protocol and data units that are compliant with an Ethernet protocol, according to another example embodiment.

After the conversion between point to multipoint optical communication signals that are compliant with a PON protocol and data units that are compliant with an Ethernet protocol, the Ports (300-2-1 to 300-2-4) of the PON Switch send out the point to multipoint optical communication signals that are compliant with a PON protocol, which have been regenerated after the conversion, to the ONU using Optical Fiber PON Lines (110-2, 110-4, 110-6, 110-8). The Ports (300-2-1 to 300-2-4) are configured to send/receive point to multipoint optical communication signals that are compliant with a PON protocol to/from the ONU, according to an example embodiment.

Although, 4 Ports (300-1-1 to 300-1-4) have been shown to receive and/or transmit point to multipoint optical communication signals that are compliant with a PON protocol from/to the OLT, according to an example embodiment and 4 Ports (300-2-1 to 300-2-4) have been shown to receive and or transmit point to multipoint optical communication signals that are compliant with a PON protocol from/to the ONU, the number of Ports communicating with the OLT and ONU varies and is independent of the side on which the Port is located, according to an example embodiment.

The Ports (300-2-1 to 300-2-4) are configured to communicate the regenerated point-to-multipoint optical communication signals according to either or both of the EPON point-to-multipoint protocol and the GPON point-to-multipoint protocol.

FIG. 2 illustrates an overview of a system depicting communication between the central office OLT 200, the PON Switch 100 and the PON MDU (FTTB) 2010/ONU (FTTH) 2001-1, 2001-2, according to an example embodiment.

As illustrated in FIG. 2, the Central Office OLT 200 is configured to send/receive point to multipoint optical communication signals that are compliant with a PON protocol to/from the Ports (300-1-1 to 300-1-4 and 300-2-1 to 300-2-4 in the FIG. 1 example) belonging to the PON Switch 100, according to an example embodiment.

The PON Switch 100 is configured to perform various conversions between point to multipoint optical communication signals that are compliant with a PON protocol and data units that are compliant with an Ethernet protocol. Thus, received point to multipoint optical communication signals are reformulated as Ethernet compliant data units, the Ethernet compliant data units which are switched in the PON switch 100, following which the Ethernet compliant data units are regenerated as point to multipoint optical communication signals that are compliant with a PON protocol. The PON Switch 100 is further configured to send/receive point to multipoint optical communication signals that are compliant with a PON protocol to/from the Central Office OLT 200, the ONU (2001-1, 2001-2) and PON-MDU (2010), according to an example embodiment.

The PON-MDU 2010, according to an example embodiment, includes a PON Switch 100. In another example embodiment, the PON-MDU 2010 also includes one or more ports to which copper-type cables are connected, in an embodiment, for the transport of data units that are compliant with the Ethernet protocol.

The PON switch 100 is selectably configured to receive and/or transmit optical signals from/to ONU for FTTH installations and to receive and/or transmit optical signals from/to MDU for FTTB installations.

In FIG. 2, the ONUs in individual houses or individual units in an apartment building, for example, are home or business routers, Ethernet switches or other network devices.

Figure 3:
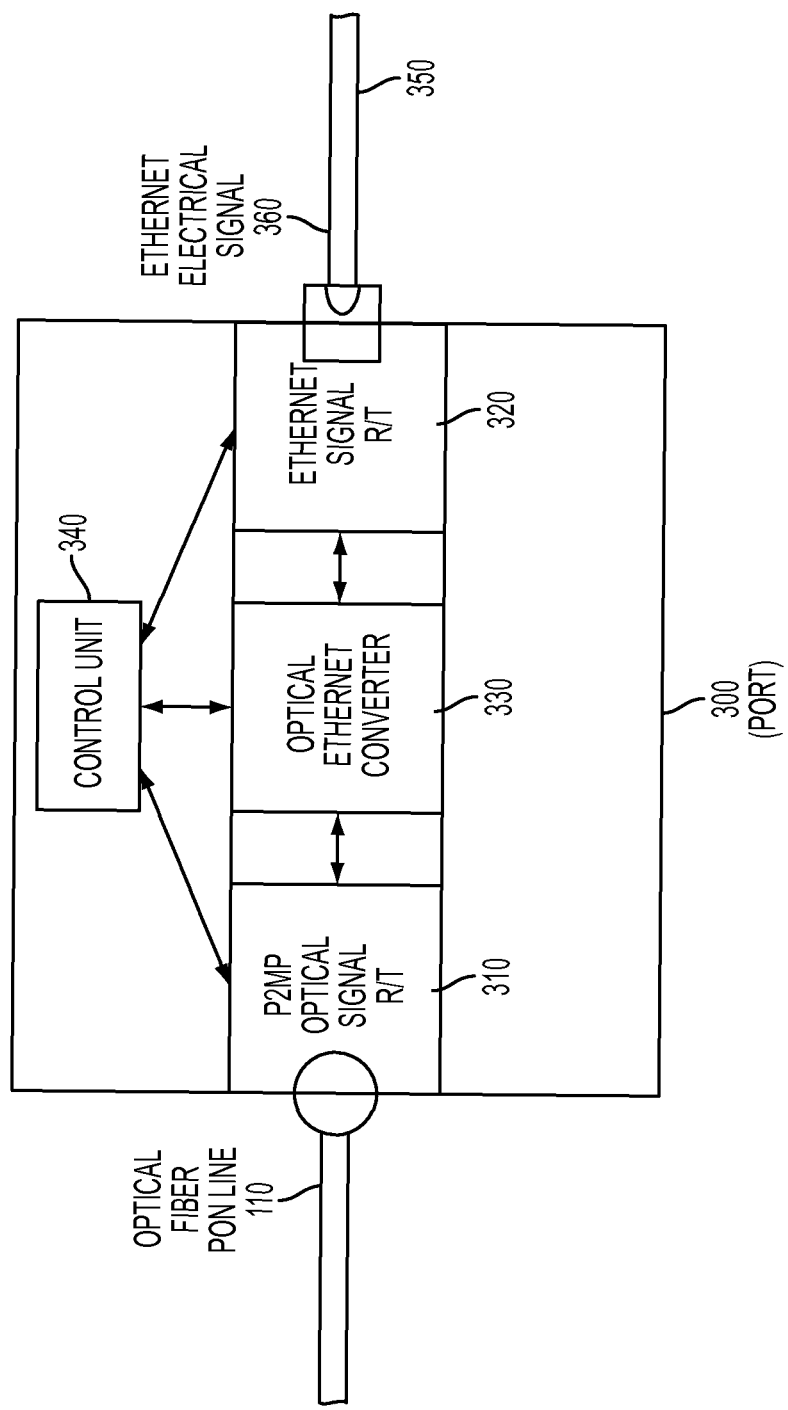
FIG. 3 illustrates an internal view of one of the ports of the PON Switch, according to an example embodiment.
Figure 4:
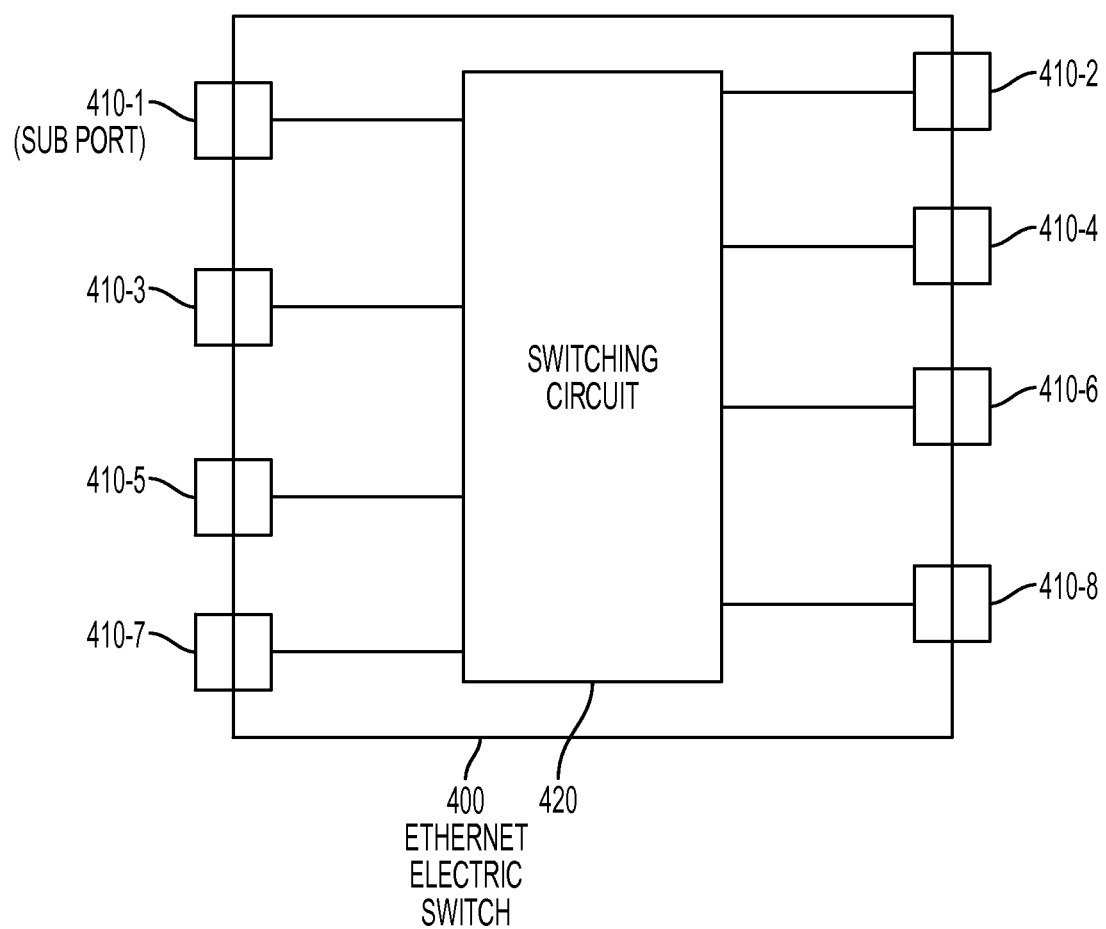
FIG. 4 illustrates an internal view of the Ethernet Electrical Switch according to an example embodiment.

FIG. 3 illustrates an internal view of one of the ports of the PON Switch, depicting conversion between point to multipoint optical communication signals that are compliant with a PON protocol and data units that are compliant with an Ethernet protocol, according to an example embodiment.

A Port 300 belonging to a PON Switch 100 sends/receives point to multipoint optical communication signals that are compliant with a PON protocol through the Optical Fiber PON line 110 at one end and sends/receives data units that are compliant with an Ethernet protocol using Ethernet Electrical Signals 360 using the Communication Path 350 at the other end, according to an example embodiment.

The point to multipoint optical communication signals that are compliant with a PON protocol and communicated through the Optical Fiber Line 110 are communicated to/from the OLT according to an example embodiment.

The point to multipoint optical communication signals that are compliant with a PON protocol and communicated through the Optical Fiber Line 110 are communicated to/from the ONU according to another example embodiment.

The data units that are compliant with an Ethernet protocol communicated through the communication path 350 are communicated to/from the Ethernet Electric Switch 400.

The Port 300 includes a Point To Multipoint Optical Signal Receiver/Transmitter 310, an Optical Ethernet Converter 330 and an Ethernet Signal Receiver Transmitter 320.

According to an example embodiment, the point to multipoint optical communication signals that are compliant with a PON protocol are received at the Point To Multipoint Optical Signal Receiver/Transmitter 310. Before they are transferred to the Ethernet Signal Receiver/Transmitter 320 to be sent out to the Sub-Ports (410-1 to 410-8 FIG. 4) belonging to the Ethernet Electrical Switch 400, they are passed through the Optical Ethernet Converter 330 where the point to multipoint optical communication signals that are compliant with a PON protocol are converted to data units that are compliant with an Ethernet protocol.

According to another example embodiment, the data units that are compliant with an Ethernet protocol are received at the Ethernet Signal Receiver/Transmitter 320. Before they are transferred to the Point to Multipoint Optical Signal Receiver/Transmitter 310 to be sent out to the OLT or the ONU, they are passed through the Optical Ethernet Converter 330 where the data units that are compliant with an Ethernet protocol are converted to point to multipoint optical communication signals that are compliant with a PON protocol.

According to another example embodiment, the Port 300 further includes a Control Unit 340 responsive to a selection signal to set the Optical Ethernet Converter 330 to perform the conversion between a selected one of the EPON point-to-multipoint protocol and the GPON point-to-multipoint protocol, and the Ethernet point-to-point protocol. Accordingly, if an EPON point to multipoint signal is received from the OLT at one port, during regeneration the Control Unit 340 of a port at the other end allows the user/service provider to selectably convert the corresponding data units compliant with the Ethernet protocol to be converted to either the EPON protocol or the GPON protocol, according to an example embodiment.

If a GPON point to multipoint signal is received from the OLT at one port, during regeneration the Control Unit 340 of a port at the other end allows for the conversion of the corresponding data units compliant with the Ethernet protocol to be to either EPON or GPON point to multipoint signal prior to sending the signal to the ONU, according to another example embodiment.

FIG. 4 illustrates an internal view of the Ethernet Electrical Switch 400 including a Switching Circuit 420 and a plurality of Sub-Ports (410-1 to 410-8), according to an example embodiment.

The Ethernet Electric Switch 400 includes Sub-Ports (410-1 to 410-8) and an Electrical Switching circuit 420.

The Sub-Ports (410-1 to 410-8) belonging to the Ethernet Electrical Switch 400 are configured to communicate data units in an Ethernet compliant electrical form among different Ports (300-1-1 to 300-1-4 and 300-2-1 to 300-2-4 in the FIG. 1 example) belonging to the PON Switch 100 based on header information of the respective data units, according to an example embodiment.

The Sub-Ports (410-1 to 410-8) are configured to communicate with the Ports (300-1-1 to 300-1-4 and 300-2-1 to 300-2-4) belonging to the PON Switch 100 using the communication paths 350 (as shown in FIG. 1).

According to an example embodiment, once data units that are compliant with an Ethernet protocol are received at one of the Sub-Ports (410-1 to 410-8), they are passed through the Electrical Switching Circuit 420 to the appropriate destination Sub Port (410-1 to 410-8) and further transmitted to the appropriate Port (300-1-1 to 300-1-4 and 300-2-1 to 300-2-4) belonging to the PON Switch 100 based on the header information of the respective data units, according to an example embodiment.

The Ethernet Electric Switch 400 is further configured to forward data units that are compliant with an Ethernet protocol, corresponding to the point-to-multipoint optical communication signal compliant with a PON protocol, from one of the Sub-Ports (410-1 to 410-8) to the appropriate destination Sub Port (410-1 to 410-8) using one of layer 2 and layer 3 forwarding mechanisms, according to an example embodiment.

While several embodiments of a PON Switch have been described above, a PON switch can be suitably fabricated by adapting an Ethernet switch to serve as a switching core and adding (i) suitable optical ports for sending and/or receiving point to multipoint optical communication signals and (ii) a conversion mechanism, coupling the optical ports and ports of the Ethernet switch, configured to convert point to multipoint optical communication signals that are compliant with a PON protocol to data units that are compliant with an Ethernet protocol, and vice versa, according to another embodiment.

Figure 5:
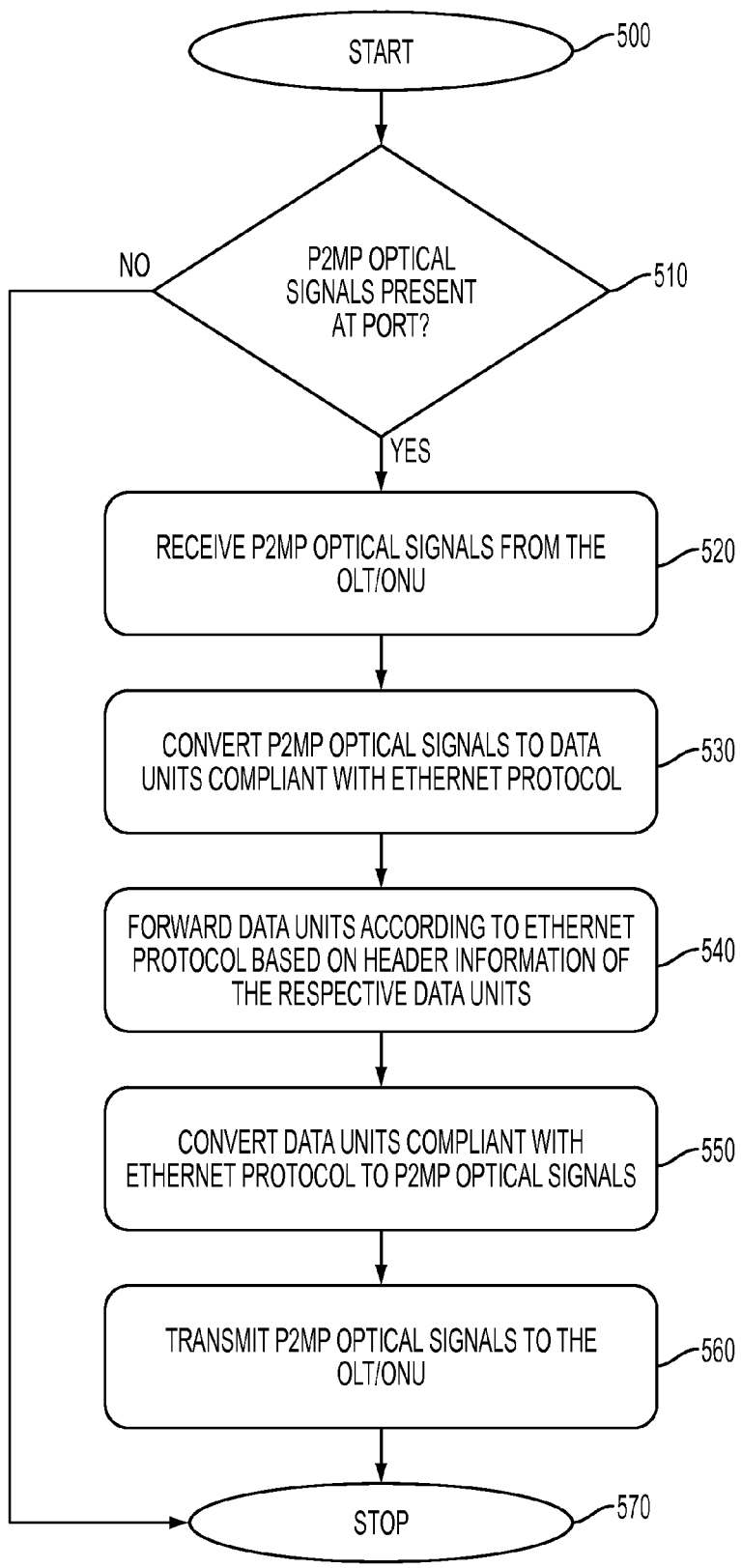
FIG. 5 illustrates a flow chart depicting the process of conveying signals in a PON according to an example embodiment.

FIG. 5 illustrates a flow chart depicting the process of conveying signals in a PON according to an example embodiment.

The process begins at 500. In 510, the PON Switch 100 checks to see if point to multipoint optical signals compliant with a PON protocol are present at any of the Ports (300-1-1 to 300-1-4 and 300-2-1 to 300-2-4). If no point to multipoint optical signals compliant with a PON protocol are present at any of the Ports (300-1-1 to 300-1-4 and 300-2-1 to 300-2-4), process continues to end at 570. If point to multipoint optical signals compliant with a PON protocol are present, the PON Switch 100 receives the point to multipoint optical signals at 520. The point to multipoint optical signals can be received from either the OLT or the ONU.

At 530, the received point to multipoint optical signals are converted to data units compliant with an Ethernet protocol. The converter 330 inside the port 300 performs this conversion, according to an example embodiment. The PON Switch 100 includes a separate conversion module to perform the conversion between point to multipoint optical communication signals that are compliant with a PON protocol and data units that are compliant with an Ethernet protocol, according to another example embodiment.

The data units are then forwarded by the Switching Circuit 420 of the Ethernet Electric Switch 400 based on the header information of the respective data units at 540. As explained above, the Ethernet Electric Switch 400 is configured to forward data units that are compliant with an Ethernet protocol, from one of the Sub-Ports (410-1 to 410-8) to the appropriate destination Sub Port (410-1 to 410-8) using, for instance, one of layer 2, layer 3 and other suitable Ethernet forwarding mechanisms, according to an example embodiment.

At 550, The forwarded data units compliant with an Ethernet Protocol are converted back to point to multipoint optical signals compliant with a PON protocol. The converter 330 inside the port 300 performs this conversion, according to an example embodiment. The PON Switch 100 includes a separate conversion module to perform the conversion between point to multipoint optical communication signals that are compliant with a PON protocol and data units that are compliant with an Ethernet protocol, according to another example embodiment.

Once the conversion has taken place, the point to multipoint optical signals compliant with a PON protocol are transmitted at 560 to the OLT/ONU over a passive optical network.

The processing continues to the end at 570.

Now, a number of suitable uses of the PON Switch 100 will be discussed.

A first use of the PON switch involves an FTTB scenario. In the FTTB approach of deploying PON, in the absence of a PON switch 100, and without a PON-MDU 2010, the optical fiber is terminated in the basement and Ethernet/DSL, for instance over copper wires, is used to carry out the communication between the basement and individual units in a dwelling structure. It is noted that Ethernet MDU installation typically is limited by the maximum distance of Ethernet, the standard for which is a maximum distance of 100 meters, thereby limiting the maximum number distance between an end user and point of entry of the optical communication signals into the MDU. Similarly, although xDSL MDU supports a maximum distance much higher than Ethernet MDU, the line rate to the end user in an xDSL MDU installation typically is dependent on the distance. Consequently, even though end users can be located farther away from the point of entry of the optical signals to the MDU, thereby facilitating a larger number of end user connections, more distant users may suffer a relative degradation in service in comparison to end users who are located less far away.

In a PON MDU 2010 (shown in FIG. 2) Switch deployed in an FTTB arrangement, point to multipoint optical communication signals that are compliant with a PON protocol are switched at the PON switch and sent all the way to ONUs of the individual units, for example to various different dwellings, in the apartment building. As a result, the need for an Ethernet MDU or an xDSL MDU within the apartment building is obviated.

Using PON Switches further provides service providers with a possibility to readily convert from an FTTH approach to an FTTB approach and vice versa depending on their customer base. If the number subscribers in a building, originally set up as FTTB by the service provider because of numerous subscribers, becomes significantly reduced, the service provider can use PON Switch to connect the ONUs in the individual apartments thereby converting to FTTH PON deployment.

It is noted that in some PON deployments there are theoretical and/or practical limits on the split ratio. That is, depending on the distance between the Optical Line Terminal (OLT) and the ONU, the optical signal can be split by passive splitters only up to a limit. The maximum split ratio of PON in the absence of a PON Switch 100 is typically 1:32, 1:64 or 1:128, which limits the flexibility of a PON network.

However, because a PON Switch 100 breaks down and subsequently regenerates the point to multipoint optical signal compliant with a PON protocol, it overcomes the limit on split ratio thereby facilitating servicing a larger number of end users. The split ratio limitation arises based on the distance to be covered by the fiber optic cable. The longer the distance that needs to be covered, the weaker the signal becomes, thereby reducing the split ratio. However, since a PON Switch 100 regenerates the point to multipoint optical signal compliant with a PON protocol, the loss of signal quality is ameliorated and systems are less susceptible to a split ratio limitation, thereby increasing the capacity of a network to direct optical signals to different locations and/or increasing the effective distance over which optical signals are conveyed.

In some PON deployments, particularly in FTTH deployments, there is the possibility that OLT PON will fail, for example as a result of a malicious attack. Consequently numerous end users whose fiber at home is passively coupled to the OLT PON may suffer from a complete or partial loss of service. By introducing one or more PON Switches 100 in local neighborhoods, the sharing of an OLT line is more limited than in conventional installations. Consequently, when an OLT line fails, e.g. as a result of such malicious attack, the effect of the failure is limited to a more localized area.

The PON Switch 100 described herein further facilitates upgrading to higher bandwidth infrastructure. As the bandwidth in any given deployment environment is often dominated by relatively low bandwidth devices, there can be an issue with upgrading to higher bandwidth, currently 10G rate. Although 10G Ethernet PON (EPON) can co-exist with 1G EPON, the low rate 1G EPON devices compete with the high rate 10G EPON devices on the same time slot, but utilize only 10% of the bandwidth using the same time slot, compared to the high rate 10G EPON devices. One conventional approach to this issue is to construct different OLT ports of 10G rates without upgrading existing lines. This leads to a low utilization of the OLT ports. Alternatively, all associated ONUs connected to the OLT port are upgraded. This solution is extremely expensive.

The manner in which a PON Switch 100 helps facilitate upgradeability issue is as follows. Since a PON Switch breaks down and regenerates the point to multipoint optical signal compliant with a PON protocol, a low bandwidth point to multipoint optical signal compliant with a 1G PON protocol, for example, can be regenerated at a 10G rate when desired. Consequently, signals coming from the low rate devices at 1G rate can be regenerated as they pass through the PON Switch 100 to 10G rates, for example, thereby leading to improved utilization of the bandwidth capabilities of passible optical network infrastructure located post regeneration.

Although a number of possible implementations have been mentioned, these are presented merely for the sake of explanation and teaching, and are not limitative. Moreover, an implementation of an apparatus that falls within the inventive concept does not necessarily achieve any of the possible benefits outlined above: such benefits are dependent on the specific use case and specific implementation, and the possible benefits mentioned above are simply examples.

Although the concepts have been described above with respect to the various embodiments, it is noted that there can be a variety of permutations and modifications of the described features by those who are familiar with this field, only some of which have been presented above, without departing from the technical ideas and scope of the features, which is defined by the appended claims.

Further, while this specification contains many features, the features should not be construed as limitations on the scope of the disclosure or the appended claims. Certain features described in the context of separate embodiments can also be implemented in combination. Conversely, various features described in the context of a single embodiment can also be implemented in multiple embodiments separately or in any suitable sub-combination.

Although the drawings describe operations in a specific order and/or show specific arrangements of components, and are described in the context of access segments of data centers, one should not interpret that such specific order and/or arrangements are limited, or that all the operations performed and the components disclosed are needed to obtain a desired result. There are numerous hardware and software devices that can be configured to forward data units in the manner described in the present disclosure with respect to various embodiments. Accordingly, other implementations are within the scope of the following claims.

There is claimed:

1. A network switching apparatus comprising:
   optical ports configured to communicate optical communication signals according to a Passive Optical Network (PON) protocol, including a first optical port and a second optical port, wherein:
      (i) the first optical port is configured to communicate as an optical line terminal (OLT) end-point using a point-to-multipoint optical communication signal according to the PON protocol,
      (ii) the second optical port is configured to communicate as an optical network unit (ONU) end-point using the point-to-multipoint optical communication signal according to the PON protocol, and
      (iii) each of the optical ports further comprises a converter configured to carry out a conversion between (a) point-to-multipoint optical communication signals compliant with the PON protocol and (b) data units that are compliant with an Ethernet protocol, wherein each data unit compliant with the Ethernet protocol comprises header information; and
   a packet switch coupled to the optical ports, the packet switch including a switching circuit configured to forward the data units between the first optical port and the second optical port (i) according to the Ethernet protocol and (ii) based on the header information of the respective data units,
   wherein the data units forwarded, by the switching circuit, between the first optical port and the second optical port are converted by the converter associated with each of the first optical port and the second optical port to optical communication signals compliant with the PON protocol.

2. The network switching apparatus of claim 1, wherein:
   the packet switch further comprises:
      electrical switch ports configured to forward data units compliant with an Ethernet protocol,
      wherein the electrical switch ports include (i) a first electrical switch port configured to communicate the data units with the first optical port, and (ii) a second electrical switch port configured to communicate the data units with the second optical port.

3. The network switching apparatus of claim 2, wherein the optical ports each further comprise:
   a point-to-multipoint optical communication signal receiver/transmitter; and
   an Ethernet compliant electrical signal receiver/transmitter,
   wherein the converter is connected to the point-to-multipoint optical communication signal receiver/transmitter and the Ethernet compliant electrical signal receiver/transmitter, and wherein the converter is configured to carry out a conversion between point-to-multipoint optical communication signal compliant with the PON protocol and the data units that are compliant with the Ethernet protocol.

4. The network switching apparatus of claim 3, wherein:
   the first optical port is configured to communicate the first point-to-multipoint optical communication signal with one of the OLT and the ONU according to one of an Ethernet PON (EPON) point-to-multipoint protocol and a Gigabit PON (GPON) point-to-multipoint protocol, and the second optical port is configured to communicate the second point-to-multipoint optical communication signal with one of the OLT and the ONU according to one of the EPON point-to-multipoint protocol and the GPON point-to-multipoint protocol.

5. The network switching apparatus of claim 3, wherein:

the first optical port is configured to communicate the first point-to-multipoint optical communication signal at a first rate comprising one of a 1 Gigabit/Sec (Gb/s) data rate and a 10 Gb/s data rate; and the second optical port is configured to communicate the second point-to-multipoint optical communication signal at a second rate comprising one of the 1 Gb/s data rate and the 10 Gb/s data rate.

6. The network switching apparatus of claim 5, wherein the first rate is different from the second rate.

7. The network switching apparatus of claim 4, wherein one or more of the optical ports each further comprise a control unit responsive to a selection signal to set the converter to selectably perform the conversion using one of the EPON point-to-multipoint protocol and the GPON point-to-multipoint protocol and the Ethernet point-to-point protocol.

8. The network switching apparatus of claim 2, wherein:

the packet switch is further configured to forward data units that are compliant with an Ethernet protocol, corresponding to the point-to-multipoint optical communication signal compliant with the PON protocol, from the first electrical switch port to the second electrical switch port using one of layer 2 and layer 1 forwarding mechanisms.

9. A method for conveying signals in a Passive Optical Network (PON), the method comprising:

receiving, at a first optical port comprising a first converter respective to the first optical port, a first optical communication signal according to a PON protocol;

carrying out a first conversion, at the first converter respective to the first optical port, from the first optical communication signal to data units compliant with an electrical Ethernet protocol, wherein each data unit compliant with the Ethernet protocol comprises header information;

using an Ethernet compliant switching circuit to forward the converted data units, (i) according to the Ethernet protocol and (ii) based on respective header information;

carrying out a second conversion, at a second converter respective to a second optical port, from the converted data units to a second optical communication signal; and transmitting the second optical communication signal according to the PON protocol, wherein the data units forwarded, by the switching circuit, are respectively converted to optical communication signals compliant with the PON protocol.

10. The method of claim 9, wherein communicating one of the first and the second optical communication signals according to the PON protocol comprises communicating point-to-multipoint optical communication signals with one of an Optical Line Terminal (OLT) and an Optical Network Unit (ONU) according to one of an Ethernet PON (EPON) point-to-multipoint protocol and a Gigabit PON (GPON) point-to-multipoint protocol.

11. The method of claim 10, wherein the communicating point-to-multipoint optical communication signals further comprises communicating the first point-to-multipoint optical communication signal at one of a 1 Gigabit/Sec (Gb/s) data rate and a 10 Gb/s data rate.

12. The method of claim 9, wherein the carrying out at least one of the first conversion and the second conversion comprises carrying out the conversion using one of an Ethernet PON (EPON) point-to-multipoint protocol and a Gigabit PON (GPON) point-to-multipoint protocol, in accordance with a selection signal.

13. The method of claim 9, wherein the using the Ethernet compliant switching circuit to forward the converted data units comprises forwarding the converted data units using one of a layer 2 and a layer 1 forwarding mechanism.

* * * * *